United States Patent

[11] 3,607,488

| [72] | Inventor | Ernesto J. Colón Yordán<br>Box 2049, Ponce, P.R. 00731 |
|---|---|---|
| [21] | Appl. No. | 743,282 |
| [22] | Filed | July 9, 1968 |
| [45] | Patented | Sept. 21, 1971 |

[54] ORNAMENTAL PRODUCTS MADE FROM PLANT MATERIAL
9 Claims, No Drawings

[52] U.S. Cl. ..................................................... 156/57, 117/3, 161/27
[51] Int. Cl. ....................................................... A01n 3/00
[50] Field of Search ........................................... 117/3.0, 4, 27; 161/7, 25, 28, 27, 30; 8/3; 156/57

[56] References Cited
UNITED STATES PATENTS

| 1,779,299 | 10/1930 | Valentine | 8/3 UX |
| 2,068,081 | 1/1937 | Sharma | 8/3 X |
| 2,298,664 | 10/1942 | Van Patter | 117/27 |
| 2,567,929 | 9/1951 | Fessenden | 117/3 |
| 2,606,843 | 8/1952 | Fessenden | 117/3 |
| 2,658,836 | 11/1953 | Fessenden | 117/3 |
| 2,978,348 | 4/1961 | Fessenden | 117/3 |
| 2,906,636 | 9/1969 | Hoivik | 117/3 |

FOREIGN PATENTS

| 2,644 | 9/1867 | Great Britain | 161/28 |

Primary Examiner—William D. Martin
Assistant Examiner—Harry J. Gwinnell
Attorney—Cushman, Darby & Cushman ABSTRACT: There is provided an ornamental object and a process for producing the same. Naturally occurring plant material is comminuted to a desired size and shape, e.g., one-sixteenth to 1 inch, treated with a preservative, e.g. formaldehyde, dyed, dried and coated with a waterproof resinous sealer.

ORNAMENTAL PRODUCTS MADE FROM PLANT MATERIAL

This invention relates to ornamental products, and more specifically to ornamental products made from naturally occurring plant material. The invention further relates to a process for producing the same.

Ornamental objects such as jewelry, and especially costume jewelry, are generally made from semiprecious stones and/or synthetic materials, e.g. plastics and glass. A major value of costume jewelry is that of providing a pleasing appearance along with numerous colors and shapes of special design for complimenting particular attires. However, many of the semiprecious stones are too costly for use with inexpensive costume jewelry and the synthetic materials generally are lacking in the range or number of colors which can be produced without undue expense.

It is therefore an object of the invention to provide ornamental objects such as costume jewelry and the like which can be made of inexpensive materials and yet provide almost limitless combinations of shape and color. It is the further object to provide a process for the manufacture of such ornamental objects. It is a further important object to provide a process which may be carried out with a minimum of equipment and by artisans.

Broadly stated, the present invention provides a process for producing ornamental objects from naturally occurring plant materials comprising the steps of comminuting the plant material to form shaped sections thereof, treating the said sections with a biologically active preservative whereby the protein materials of said sections are fixed and putrification is prevented, treating the preserved sections with a dye or staining agent whereby the sections are colored, drying the said colored sections and coating the colored sections with a transparent waterproof sealer. While the process of the present invention is generally applicable to any plant material, it is especially suitable for use with roots, tubers, fruits, bulbs, seeds and nuts or other plant materials, and is especially applicable for such materials which have relatively low water content, e.g. less than 20 percent by weight, preferably less than 10 percent by weight. It is a special feature of the present invention in that the process is applicable to tropical plant materials which may be processed in an inexpensive manner, and therefore suitable for use by people on the islands and possessions of the United States where industrial equipment is not easily obtained. In this regard, the wide applicability of the present process for use with various plant materials, and especially to tropical plant materials, is illustrated by the following examples, but it is to be understood that the invention is not limited to the specific examples:

1. Yuca—native root to Puerto Rico and Caribbean
2. Batata—variety of sweet potato
3. Yautia—tuberous root found in Puerto Rico
4. Name—tuberous root found in Puerto Rico
5. Quenepa—seed of a tree indigenous to southern and western Puerto Rico
6. Panapen—fruit similar to breadfruit grow in trees in northern and central area of Puerto Rico
7. Pana—native chestnuts
8. Plantains—variety of banana
9. Bananas—different varieties
10. Moca—seed from the Moca Tree
11. Potatoes—any variety
12. Gladiolas bulbs—produced throughout the United States
13. Apio—celery
14. Malanga—bulbous root of "elephant ear" plant Since the products of the present invention must ultimately be processed so that they contain substantially no water, it is preferable that the plant material chosen should be a plant of relatively low water content or chosen at a time when the plant material has a low water content, e.g. an unripe stage. For example, if bananas are to be used as the starting material in the present process, the bananas should be picked in an unripe stage, before they have developed their maximum water content. On the other hand, fully developed tubers and roots may be used since these materials contain low water contents even in the fully developed state.

The plant material is comminuted in any way desired, as by slicing, cutting, bdicing, chipping or otherwise to provide sizes commensurate with the object of ornamentation to be produced. In this respect any desired section may be used, e.g. from one-sixteenth inch up to an inch or more. However, it should be noted that since the plant materials will contain some water and that the water must be substantially removed during the processing of these plant materials, some shrinkage will result. Therefore, sections cut should be made in such a manner as to allow for the shrinkage characteristic of the particular plant material being utilized. For most purposes from one-eighth inch to up to three-fourths inch will be suitable and especially about one-quarter inch in at least one dimension. Cuttings may be made across the fiber grains or with the fiber grains, taking into account the texture for the final ornamental effect desired. After the cutting of the sections, further shaping may be performed, e.g. in squares, cubes, rectangles or and other desired shape depending upon the ornamentation desired.

Since all plant material is subject to bacterial action and decay, the plant material of the invention must be treated with a preservative agent, preferably one which will also fix (harden) the protein materials. The particular preservative is not critical to the present invention but it has been found that liquid preservatives are more suitable, since they will permeate into the plant material sections more easily than solid or gaseous preservatives, the latter of which generally require elevated pressure. In this regard, with liquid preservatives the sections may be simply immersed in the preservative and allowed to soak for an appropriate length of time. For example, sections having between one-fourth and one-half inch dimensions may be soaked for 96 hours or more and will be thoroughly preserved and/or hardened with conventional preservatives. Of course, other periods may be used; for example, 48 hours of soaking time is ample for less than one-fourth inch sections. Of course smaller sections require less time, e.g. a one-sixteenth inch section is suitably preserved in about 20 hours. However, if it is desired to decrease the preservation time, the sections may be immersed in the preservative and allowed to soak under elevated pressures, e.g., 2 to 200 atmospheres. Elevated pressures will increase the rate at which the preservative permeates into the sections and will accordingly decrease the time necessary for complete preservation of the plant material. A similar result is obtained at elevated temperatures, e.g., up to 212° F.

As noted above, the particular preservative is not critical to the present invention. However, formaldehyde is an easily obtainable and a very satisfactory preservative. In this regard it has been found that a mixture of formaldehyde and ethyl alcohol provides very good results in that the penetration of the preservative is exceptionally uniform. Preferably, the solution should have at least two parts of 10 percent formaldehyde for each part of ethyl alcohol. Suitably, other alcohols may be used, especially lower alcohols of 1 to 6 carbon atoms. Of course if desired formaldehyde solutions other than 10 percent may be used, e.g., 20, 30 percent.

After the sections have been treated with the preservative agent they are removed from the solution and allowed to partially dry. Their drying may be as desired, e.g., simply drying at room temperature, in sunlight or in an oven. The drying time is not critical, and will vary greatly depending upon the mode and temperature of drying. For example, at 150° to 200° F. a short period of about one-fourth to three-fourth hours for one-fourth inch sections is generally sufficient. If the sections are to be dried in sunlight, about 24 hours is required. In any case, the partial drying step should remove the water content of the sections to about 5 percent by weight of water, or less. The drying temperature should be kept below 212° F., since if temperatures above **° F. are used, the tissues of the plant material tend to become disrupted as a result of the boiling aqueous liquids inside the plant material.

The preserved sections are then treated with a dye or staining agent to give the desired ornamental effects. For example, the sections may be simply immersed in a solution of a dye. Alternately, the sections may be brushed or sprayed with a dye, or any other manner desired. Staining agents are equivalents of dyes for the present invention, and the two may be used on the same section if desired. While almost any dye is suitable for the process of the present invention, in a preferred embodiment, the dye chosen is one which is suitable for protein materials, such as wool dyes, cellulosic dyes (cotton, rayon, etc.) and hair dyes. Examples of suitable dyes are: the mordant dyestuffs fixed with mineral salts, the azo dyestuffs, the Indanthrone dyestuffs, the anthraquinone dyestuffs, water-soluble hydrosulfites and formaldehyde-sulfoxylates, napthols, Indigosols, Palatine Fast Colors, and Indigos to name a few.

The concentration of the dye in the solution and the solvent for dissolving the dye is not critical. It is most convenient, however, to use water as the solvent and water-dissolvable dyes. In this regard, where the solvent is water or an organic solvent, it is preferable to include in the dye solution a small amount of a surface active agent, e.g., up to 8 percent. The surface active agent should be capable of lowering the surface tension of the dye solution to at least 50 dynes/cm. or less, preferably 40 dynes/cm. or less. The purpose of the surface-active agent is to allow a faster and more uniform penetration of the dye solution into the plant material. Also, many surface-active agents will dissolve fats, oils and waxes within the plant material. This latter aspect is important for many types of fruits and vegetables which are excessively oily or waxy. Examples of suitable surface active agents are the aliphatic and aliphatic-aromatic sulfonates, alkylated naphthalenes and benzenes, sulfoesters and sulfoacyls, sulfoamides and acylamides, sulfonamide sulfonates, sulfated fatty alcohols olefins, glycerides-acids and esters, quaternary ammonium compounds, polyethenoxy, polyglycerols, and fatty esters of polyhydroxy alcohols, especially ethylene oxide fatty acid and/or fatty alcohol condensates, the sulfated alcohols, oils and glycerides. Specific examples of the above are lauryl, cetyl, oleyl, steryl alcohol sulphates, sulphonated castor and olive oil esters of glycerine and fatty acids of 10 to 18 carbon atoms. See pages 31 through 41 of Industrial Detergency, Niven, Jr., Rinhold Publ. Co., New York, N.Y. (1955) for more detail, the disclosure of which is incorporated herein by reference.

The dyeing time is, of course, a matter of choice and will vary greatly depending upon the dye being utilized and the depth and shade desired for the ornamental section, e.g., 1 second to 100 hours. In this regard, the soaking times noted in connection with preserving step are again applicable for most purposes, since the penetration of the dye solution will be roughly the same as that of the preserving solution. For example, a ¼-inch section can be dyed to a great depth in about 48 hours or less. However, for smaller or larger sections or less desired dye penetration, the time will be adjusted accordingly, e.g., 1 to 50 hours. Preferredly, the dye solution should penetrate to a depth of at least 10 percent of the smallest dimension of the section. More than one dyeing step may be performed, depending on the effect desired.

When a dyed section is immersed in a second dye solution for obtaining a second color, the first dye may become somewhat mottled it the second dye solution contains a solvent for the first dye. For example, if both the first and second dyes are dissolved in water, solutions the second dye may somewhat mottle the first dye. This is not necessarily undesirable, since the mottled or comingling effect is most striking and desirable for many applications. However, if it is preferred that the dyes be distinct and not mottled, the first and second dyes should be so chosen that they are dissolved in solvents which are imiscible with one another or the first dye should be a reactive dye. For example, the first dye may be a water-soluble dye while the second dye is a hydrocarbon-soluble dye, such as soluble in benzene or aliphatic hydrocarbons. Of course, the surface-active agent should be chosen for the particular solvent being used with each dye.

As an alternate, heat activated dyes may be used for the first dyeing step. In this regard, after the first dyeing step, the sections are merely heated to set the dyes. Therefore, the second dyeing step will not mottle or comingle with the first dyed color.

The particular dyes that may be used to obtain any degree of reactivity with any color are well known to the art and may be determined by simply consulting standard dyeing textbooks. Such dyeing textbooks will provide more than sufficient information for one to choose a dye which will produce the color desired, as well as suitable solvents and concentrations of the dye.

When it is desired that the dye react with plant material, a protein-reactive dye should be chosen. However it should be carefully noted that it is not necessary for the dye to react with the protein material and thereby be affixed to the plant material in a permanent type of chemical bonding. For example, the dye may be simply a water-soluble cake coloring, a tempera paint or even a completely nonreactive material such as carbon black or finely ground metallic powder. It is only necessary that the coloring material be in such a form that it can be assimilated into the plant material by penetration of the dye solution or carrier, e.g., water or alcohol. This feature allows a wide choice of suitable coloring materials and further allows the processing of the plant materials under nonfactory conditions, e.g. in the home and by an unskilled person. It further allows for a wide variety of ornamental effects for the exercise of individual talents in choosing dyeing materials, color and textures. Of course, when nonfactory conditions are used, such as in the home, the wetting agent can suitably be chosen among those normally available through grocery stores and the like. For example, most dishwashing detergents and/or laundry detergents are suitable for use with both water-soluble and hydrocarbon-soluble dyes.

As with the preservation step, the dyeing step may be carried out under elevated pressures, e.g., 2 to 200 atmospheres and at elevated temperatures, up to the boiling point of the solvent used, but in any case less than 212° F.

After the dyeing step, the sections are again dried. In this regard the drying conditions and modes of drying as noted above in connection with the first drying step are again applicable. The drying temperature should always be less than 212° F. for the reasons noted above. However, in the case where solvents other than water are used in the dyeing step, the drying step should be at a temperature less than the boiling point of the solvent used. Also, as noted above, the drying can be simply at room temperature or in sunlight. It is preferable that the sections are turned while they are being dried as by agitating in a shaker screen or simply turning by hand. In any event when drying at elevated temperatures, e.g., 115° to 125° F. the sections should be turned about every 4 hours or less in order to avoid curling, resulting from one surface near the heat source drying more completely while the other surface remains more moist. If sunlight is used, aluminum foil may be placed under the sections for a greater utilization of the sun rays. As above, the sections should be turned periodically during the drying step. For most plant material 4 to 5 days in tropical sunlight or an equivalent is more than adequate for producing sufficient drying. In this regard, whatever the drying temperature or mode used, the sections after having been dried should contain no more than 2 percent water.

After the drying steps, the sections are then fashioned into the final shape of the ornamental object. This may include further cutting, grinding, sanding, or the like to obtain the desired effect. Also it may include sculpturing or carving in relief or attachment of other ornamental objects or decorations to the section as by gluing, or mounting with mechanical means, e.g., screws, etc. Where more than one dye has been applied to the section, sanding of the surface will bring up various hues and colors. Preferably, the sanding should be done with fine or extra fine sandpaper such as 180 silicone carbide paper. However, if a rough texture is preferred, sanding can be omitted or if a roughened texture is preferred, sandblasting may be used which will bring the various hues and shades to the surface of the section. The sections may be split into several sections, for example, one thirty-second to three thirty-seconds inch, suitably one-eighth inch. This allows for the production of more than one ornamental object from each individual section. At this point the geometric shape of the sections may be altered by cutting into various shapes such as diamonds, triangles, circles, etc.

It is desirable that the so-processed shapes should undergo a further preservation step with a nonaqueous preservative. In this regard, any of the wood preservatives are useful and will ensure that the ornamental objects will be completely free of bacterial material and will not at some later date begin the process of putrification. This is accomplished simply by immersing the dry materials in the nonaqueous wood-type preservative, many of which are known to the art. Suitable wood preservatives are the halogenated phenols and cresols, e.g., pentachloro and the tetrachlorophenol. Suitably a 1 to 10 percent solution of the preservation in a hydrocarbon solvent is sufficient. As above, this second preserving step may be carried out under pressure and/or elevated temperatures if desired. However, for most purposes elevated pressures or temperatures are not required since this second preserving step will normally require an immersion of only about 5 to 45 minutes.

Again, the section may be sanded and/or treated in any other manner to smooth or roughen the surface. Also for greater brilliance of the surface, the sections may be treated with a small amount of solvent for the dyes to cause migration thereof to the surface of the section. The solvents used to dye the sections may be used in this step or other solvents, if desired. It has been found, however, that brushing the dyed sections with a small amount of turpentine will cause slight penetration of the turpentine into the dyed sections and produce a brilliance of the dyes at the surface of the section. This is true for both water-soluble and hydrocarbon-soluble dyes and turpentine is a preferred material for this step. When such treatment is used, the sections again should be allowed to dry before the final waterproofing step. Also, it should be noted that the sections may be treated with metal powders, dust, flakes or slivers to produce an unusual and striking surface effect. For example, copper, aluminum, iron, and zinc powers and dust may be sprinkled on the surface of the sections. Alternately, in the step where a solvent, e.g., turpentine, is applied to the surface of the sections to bring out the dye, may be modified by including a small amount, e.g. 5–40 percent by weight, of varnish, lacquers or the like in the turpentine as well as one or more of the above-named metallic powders, dust, etc. Therefore, in that step, the solvent not only brings the dye to the surface of the sections but deposits, glues and adheres onto the surface the metallic particles. Of course, gluing materials other than varnish or lacquers may be used.

As a final step, the sections are coated with a clear transparent waterproofed sealer. The sealer may be chosen from any of the many resinous or plastic materials readily available on the market. For example, acrylics, epoxies, polyesters, etc., may be used. Many of these sealer materials require curing at elevated temperatures. In this regard, the temperatures may exceed 212° F. since essentially all of the water in the plant materials has now been removed. This of course allows for a wide variety of coating materials to be used. Again, the surface may be sanded, abraded, carved, etc., to produce the final effect.

The finished sections are then attached to any mechanical devices as may be desired. For example, suitably shaped sections may be attached to ear clips, cuff links, pendants, medallions, hanging earrings, rings, tie clasps, tie bars, pins, dress buttons, studs, formal wear, etc. Also the sections may be used as ceramic tiles, making mosaics, tops for coffee tables, or wall plaques. The particular uses of the colored sections of the present invention are almost limitless and are suitable for both indoors and outdoors use. Since, the sections are essentially free of water, they may be used in sunlight or out of sunlight. However, as will be appreciated when used in strong sunlight a dye should be chosen for the dyeing step that is resistant to ultraviolet light.

The ornamental objects so obtained by the process are characterized mainly in that they are preserved, shaped sections of naturally occurring plant material which have less than 2 percent by weight of water therein. They are further characterized in that at least a portion of the surface of the sections are dyed or stained and have an ornamental design formed therein and/or in the shape of an ornamental design. The sections are further characterized in that they are coated with a waterproofed translucent resinous material. As described above, the sections may also be attached to ornamental holders and the like and may have sanded areas or rough areas, alternately with metal flakes and powders and like materials disposed on or in the surface of the sections. Also, the sections may be multicolored and sculptured.

The following example will illustrate the process of the present invention. However, it is to be clearly understood that the process is applicable to the breadth described above and not limited to the specific example below.

EXAMPLE

The following example illustrates that the invention may be carried out with a minimum of equipment and is suitable for use by nontechnical artisans.

Twelve fully developed in size but unripe (green) bananas were washed with clean tapwater to remove dirt from the peels. One-half of each banana was cut into sections of one-fourth inch thick. The other half was cut in slanted sections, of the same thickness, at 40° to 60° angles from the long axis. The banana peel was not removed.

The sections were then placed in a freshly prepared solution of two parts 20 percent formaldehyde and one part absolute ethyl alcohol. The sections were kept in a covered container for a period of 96 hours while being held within a polyethylene bag which had multiple perforations to allow the solution to flow through the bag.

After 96 hours, the sections were removed, spread on a wooden board, and allowed to air-dry in the shade at about 75°–85 F. for 24 hours.

After drying, the sections were again placed in a polyethylene bag which had multiple perforations and placed in a 3-gallon container having a dyeing solution therein. This solution was prepared by dissolving 5 ounces of water-soluble powdered dye (brilliant green) (Tintex) in 1 gallon of hot tapwater, to which one tablespoonful of Clarion XIV detergent and one-half ounce of benzalkonium chloride (preservative) had been added. After immersion in this solution for 24 hours, the plastic bag with the sections was removed and allowed to drain for 2 hours. The bag with the sections was then placed in another dyeing solution, prepared by dissolving 5 ounces of Tintex (ruby red) in 1 gallon of absolute ethyl alcohol, to which was also added one-half ounce of benzalkonium chloride, and one tablespoonful of Clarion XIV detergent. The sections were immersed in the solution for a period of 58 hours; the bag was removed from the solution and the sections were placed on absorbent paper to remove excess liquid from both sides.

The sections were then placed on aluminum foil trays, and placed in the oven, preheated to a temperature of 200° F. During the drying, the sections were turned over after drying for 5 hours. Drying was complete after 9 hours and 20 minutes. One surface of the dry sections was then sanded with a fine silicone carbide paper (180) until the desired color hues were obtained.

The sections were sanded by hand on the other side until a thickness of one-eighth inch was obtained. Alternately, the sections may be placed with the first sanded surface down, on a steel board which has depressions one-eighth inch deep to hold the sections firmly in place while being sanded. The rough surface of the sections are faced up and to this is applied a hand belt sander with medium or fine sanding paper. Pressure is applied while sanding away until the section surface is flush with the steel plate giving the section an average, uniform thickness of approximately one-eighth inch.

The sections were then cut with a knife to form circles for mounting in a multipronged jewelry setting. However, if desired the sections may be cut with a tool steel cutting die to the desired shape, according to the jewelry setting to be used. A press may also be used with the die for cutting.

The shaped sections were treated with a wood preservative by placing them in a cloth bag with a purse string closure and immersing them in a solution of pentachlorophenol (2.9 percent) and tetrachlorophenol (1.5 percent) dissolved in petroleum solvents. After 15 minutes of treatment the sections were removed from the solution, spread on a clean dry glass slab and allowed to air dry for 24 hours.

The sections were attached to a circular ear clip setting of 18 mm. diameter, using epoxy glue and the prongs. The assembly was allowed to dry for 24 hours, while standing erect and impaled in a block of plastic foam to avoid tilting.

After 24 hours, the ear clip was held by hand and a final sanding with fine silicone carbide paper was performed. The top surface of the section was then brushed with a solution of two-thirds part turpentine and one-third clear varnish to which we added one teaspoonful of copper dust for each 250 cc. of solution.

After drying for 24 hours at room temperature, the surface was coated with transparent acrylic resin, to cover the whole surface of the section. After 6 hours the surface was lightly sanded and a second acrylic coating was applied, extending to the sides of the section, in order to provide an additional seal between the section and the jewelry setting used. After 24 hours of drying, the section was sanded with very fine silicone carbide paper. A third coating of acrylic was applied and the finished piece of jewelry was allowed to air dry for 3 days at room temperature before being placed in a jewelry box.

As can be appreciated, the number of sandings are optional and depend upon the smoothness desired. Of course, if a rough surface is desired, the sandings may be omitted. Also the treatment with turpentine/varnish/copper dust is optional, and the sequence of cutting, treating with the wood preservatives and assembling may be in any order. It is only necessary that as a final step, the sections are coated with the transparent resin, but of course the assembling may be after the coating step.

As will be apparent to those skilled in the art, the invention may be practiced with various modifications readily apparent to those skilled in the art. Accordingly, those modifications are intended to be embraced by the invention, and the invention is limited only by the spirit and scope of the following claims.

1. A process for producing ornamental objects from naturally occurring plant material consisting essentially of the steps of:
   1. comminuting a plant material to form shaped sections having at least one dimension of between about one-sixteenth inch up to 1 inch and the comminuted sections having a water content of less than 10 percent by weight;
   2. treating the said sections with a biologically active preservative whereby the protein materials of the said sections are hardened and putrification is prevented and partially drying the hardened sections to a water content of about 5 percent by weight or less;
   3. treating the preserved and partially dried sections with a dye whereby the sections are colored;
   4. drying the said colored sections to a water content of about 2 percent by weight or less;
   5. treating the dried and colored sections further with a wood-preserving agent; and
   6. coating the colored sections with a transparent waterproof resinous sealer.

2. The process of claim 1 wherein the drying of step (4) is carried out at a temperature of from about room temperature up to 212° F. for a period of time to reduce the water content of the said sections to less than 2 percent by weight and the said sections are agitated during the said drying.

3. The process of claim 1 wherein the coating of step (6) is a hardenable, transparent plastic resin.

4. The process of claim 1 where the dried, colored and preserved sections of step (5) are sanded, designs are formed on the said sections, and the sections are cut to form a shape, and affixed to a holder.

5. The process of claim 1 wherein the dried, colored and treated sections of step (5) are further treated with a solvent for the said dyes for a period of time to partially dissolve the dyes and flow part of the dyes to the surface of the said sections, and the so-treated sections are again dried.

6. The process of claim 1 wherein the dyeing of step (3) imparts more than one color to the said sections and the dye is applied to the said sections in a solution of the said dye which solution penetrates into the said section to a depth of at least that equal to 10 percent of the smallest dimension of the said sections.

7. The process of claim 6 wherein the dyes are protein dyes and the surface tension of the solution is less than 50 dynes/cm.

8. The process of claim 1 wherein the preservative contains formaldehyde dissolved in a lower alkanol of up to six carbon atoms.

9. The process of claim 8 wherein the preservative contains at least two parts by weight of 10 percent formaldehyde for each part by weight of at least 70 percent ethyl alcohol and the so preserved sections are partially dried at temperatures from about room temperature up to 212° F. for a period of time whereby the partially dried sections have a water content of less than 5 percent by weight.